United States Patent
Du et al.

(10) Patent No.: US 11,010,227 B2
(45) Date of Patent: May 18, 2021

(54) EXCEPTION STACK INFORMATION ACQUISITION METHOD AND DEVICE AND COMPUTER-READABLE STORAGE MEDIUM

(71) Applicant: PING AN TECHNOLOGY (SHENZHEN) CO., LTD., Shenzhen (CN)

(72) Inventors: Yuan Du, Shenzhen (CN); Longfei Ye, Shenzhen (CN)

(73) Assignee: PING AN TECHNOLOGY (SHENZHEN) CO., LTD., Shenzhen (CN)

( * ) Notice: Subject to any disclaimer, the term of this patent is extended or adjusted under 35 U.S.C. 154(b) by 413 days.

(21) Appl. No.: 16/088,831

(22) PCT Filed: Sep. 30, 2017

(86) PCT No.: PCT/CN2017/105018
§ 371 (c)(1),
(2) Date: Sep. 27, 2018

(87) PCT Pub. No.: WO2018/227822
PCT Pub. Date: Dec. 20, 2018

(65) Prior Publication Data
US 2021/0096942 A1   Apr. 1, 2021

(30) Foreign Application Priority Data
Jun. 12, 2017  (CN) .......................... 201710440288.8

(51) Int. Cl.
*G06F 11/00*      (2006.01)
*G06F 11/07*      (2006.01)
(Continued)

(52) U.S. Cl.
CPC ...... *G06F 11/0772* (2013.01); *G06F 11/0787* (2013.01); *G06F 11/302* (2013.01); *G06F 11/3055* (2013.01); *G06F 11/3476* (2013.01)

(58) Field of Classification Search
None
See application file for complete search history.

(56) References Cited

U.S. PATENT DOCUMENTS

| | | | |
|---|---|---|---|
| 10,782,945 B1* | 9/2020 | Craik | G06F 8/4434 |
| 2002/0073135 A1* | 6/2002 | Meyer | G06F 9/4843 |
| | | | 718/107 |

(Continued)

FOREIGN PATENT DOCUMENTS

| | | |
|---|---|---|
| CN | 1731310 A | 2/2006 |
| CN | 101261603 A | 9/2008 |

(Continued)

OTHER PUBLICATIONS

Google Patents/Scholar—text refined (Year: 2020).*
Google Scholar/Patents—text refined (Year: 2021).*

*Primary Examiner* — Christopher S McCarthy (57) ABSTRACT

An exception stack information acquisition method, including: when a preset exception signal is sensed in a running process of a project, calling and executing an exception signal processing function to acquire first exception stack information of a native layer; reading second exception stack information recorded by an Application (APP) layer when the exception signal is sensed; and assembling the first exception stack information and the second exception stack information to obtain assembled information, then reporting the assembled information to a server, and aborting the project after reporting is completed.

14 Claims, 4 Drawing Sheets

(51) Int. Cl.
*G06F 11/34* (2006.01)
*G06F 11/30* (2006.01)

(56) References Cited

U.S. PATENT DOCUMENTS

| | | | |
|---|---|---|---|
| 2007/0294675 A1* | 12/2007 | Barraclough | G06F 9/45516 717/137 |
| 2008/0307441 A1* | 12/2008 | Kuiper | G06F 9/4484 719/321 |
| 2009/0013208 A1* | 1/2009 | DiMuzio | G06F 9/4812 714/2 |
| 2009/0089764 A1* | 4/2009 | Lai | G06F 9/4484 717/143 |
| 2012/0191893 A1* | 7/2012 | Kuiper | G06F 13/24 710/269 |
| 2015/0095338 A1 | 4/2015 | Baggott et al. | |
| 2016/0299832 A1 | 10/2016 | Bogusz et al. | |
| 2020/0387357 A1* | 12/2020 | Mathon | G06F 9/5077 |

FOREIGN PATENT DOCUMENTS

| | | | | |
|---|---|---|---|---|
| CN | 103092746 A | 5/2013 | | |
| CN | 103152381 A | 6/2013 | | |
| CN | 103544096 A | 1/2014 | | |
| CN | 103544447 A | 1/2014 | | |
| CN | 104021063 A | 9/2014 | | |
| CN | 104424090 A | 3/2015 | | |
| CN | 104598313 A | 5/2015 | | |
| CN | 104899111 A | 9/2015 | | |
| CN | 105204990 A | 12/2015 | | |
| CN | 105320572 A | 2/2016 | | |
| CN | 105446822 A | 3/2016 | | |
| CN | 105450731 A | 3/2016 | | |
| CN | 105653432 A | 6/2016 | | |
| CN | 105844157 A | 8/2016 | | |
| CN | 105930139 A | 9/2016 | | |
| CN | 106293629 A | 1/2017 | | |
| CN | 106598770 A | 4/2017 | | |
| EP | 1306753 A2 * | 5/2003 | | G06F 9/4484 |
| WO | 2009146612 A1 | 12/2009 | | |

* cited by examiner

EXCEPTION STACK INFORMATION ACQUISITION METHOD AND DEVICE AND COMPUTER-READABLE STORAGE MEDIUM

CROSS-REFERENCE TO RELATED APPLICATIONS

This application is the national phase entry of International Application No. PCT/C2017/105018, filed on Sep. 30, 2017, which is based upon and claims priority to Chinese Patent Application No. CN201710440288.8, filed on Jun. 12, 2017, the entire contents of which are incorporated herein by reference.

TECHNICAL FIELD

The present invention relates to the technical field of computers, and particularly relates to an exception stack information acquisition method and device and a computer-readable storage medium.

BACKGROUND

At present, in case of an Application (APP) exception in the program design, a user in the process of using the APP may encounter the crash and flashback of the APP caused by a running exception of the APP, which results in the failure of the normal use of the APP. Therefore, for an APP developer, it is necessary to acquire exception stack information generated at the time of APP program exception and timely locate and analyze an exception code in the APP program.

An existing manner for acquiring exception stack information is usually to locally acquire and upload the exception stack information when a program is restarted after the exception and crash of APP program occur. However, such a processing manner has some defects. If a user does not restart the APP after the exception and crash of the APP program, it is impossible to implement uploading.

SUMMARY

The present invention provides an exception stack information acquisition method and device and a computer-readable storage medium, with the main purpose of solving the technical problem in the prior art that it is difficult to timely acquire and upload exception stack information in an APP program.

To this end, the present invention provides an exception stack information acquisition method, which includes:

when a preset exception signal is sensed in a running process of a project, calling and executing an exception signal processing function to acquire first exception stack information of a native layer;

reading second exception stack information recorded by an APP layer when the exception signal is sensed; and assembling the first exception stack information and the second exception stack information, then reporting the assembled information to a server, and aborting the project after reporting is completed.

Optionally, the step of calling and executing the exception signal processing function to acquire the first exception stack information of the native layer when the preset exception signal is sensed in the running process of the project includes:

when the preset exception signal is sensed in the running process of the project, determining version information of an operating system running the project; and calling and executing the exception signal processing function corresponding to the version information of the operating system to acquire exception address information and generating the first exception stack information according to the address information.

Optionally, the step of calling and executing the exception signal processing function corresponding to the version information of the operating system to acquire the exception address information and generating the first exception stack information according to the address information includes:

calling and executing the exception signal processing function corresponding to the version information of the operating system to acquire the exception address information;

acquiring exception stack data according to the address information, and acquiring a signal type of the sensed exception signal; and assembling the signal type and the exception stack data to generate the first exception stack information.

Optionally, the step of assembling the first exception stack information and the second exception stack information, reporting the assembled information to the server, and aborting the project after reporting is completed includes:

reading a stored symbol table, and recovering the acquired first exception stack information on the basis of the symbol table to convert the first exception stack information into third exception stack information readable for the server; and assembling the third exception stack information and the second exception stack information, then reporting the assembled information to the server, and aborting the project after reporting is completed.

In addition, to this end, the present invention further provides an exception stack information acquisition device, which includes: a memory, a processor and an exception stack information acquisition program stored on the memory and capable of running on the processor, wherein the exception stack information acquisition program is executed by the processor to implement the steps of:

when a preset exception signal is sensed in a running process of a project, calling and executing an exception signal processing function to acquire first exception stack information of a native layer;

reading second exception stack information recorded by an APP layer when the exception signal is sensed; and assembling the first exception stack information and the second exception stack information, then reporting the assembled information to a server, and aborting the project after reporting is completed.

Optionally, the step of calling and executing the exception signal processing function to acquire the first exception stack information of the native layer when the preset exception signal is sensed in the running process of the project includes:

when the preset exception signal is sensed in the running process of the project, determining version information of an operating system running the project; and calling and executing the exception signal processing function corresponding to the version information of the operating system to acquire exception address information, and generating the first exception stack information according to the address information.

Optionally, the step of calling and executing the exception signal processing function corresponding to the version information of the operating system to acquire the exception address information and generating the first exception stack information according to the address information includes:

calling and executing the exception signal processing function corresponding to the version information of the operating system to acquire the exception address information;

acquiring exception stack data according to the address information, and acquiring a signal type of the sensed exception signal; and assembling the signal type and the exception stack data to generate the first exception stack information.

Optionally, the step of assembling the first exception stack information and the second exception stack information, then reporting the assembled information to the server, and aborting the project after reporting is completed includes:

reading a stored symbol table, and recovering the acquired first exception stack information on the basis of the symbol table to convert the first exception stack information into third exception stack information readable for the server; and assembling the third exception stack information and the second exception stack information, then reporting the assembled information to the server, and aborting the project after reporting is completed.

Optionally, the step of reading the stored symbol table and recovering the acquired first exception stack information on the basis of the symbol table to convert the first exception stack information into the third exception stack information readable for the server includes:

starting an information recovery script, and sequentially matching a function name in the first exception stack information with function names in the symbol table one by one on the basis of the information recovery script to acquire a filename and row number corresponding to the function name in the first exception stack information; and adding the acquired filename and row number to an original first exception stack information to generate the third exception stack information readable for the server.

Moreover, to this end, the present invention further provides a computer-readable storage medium storing therein an exception stack information acquisition program, wherein the exception stack information acquisition program is executed by a processor to implement the steps of:

when a preset exception signal is sensed in a running process of a project, calling and executing an exception signal processing function to acquire first exception stack information of a native layer;

reading second exception stack information recorded by an APP layer when the exception signal is sensed; and assembling the first exception stack information and the second exception stack information, then reporting the assembled information to a server, and aborting the project after reporting is completed.

According to the exception stack information acquisition method and device and computer-readable storage medium disclosed by the present invention, when the preset exception signal is sensed in the running process of the project, the exception signal processing function is called and executed to acquire the first exception stack information of the native layer, the second exception stack information recorded by the APP layer when the exception signal is sensed is read, the exception stack information of the native layer and the APP layer is assembled and then reported to the server, and the project is aborted after reporting is completed, so that the project is prevented from being directly forcibly terminated after the exception is detected. Moreover, according to the present invention, complete exception stack information including that of the first exception stack information of the native layer may be timely acquired and uploaded to the server through the predefined exception signal processing function, so that occurrence of the exception may be comprehensively monitored, the exception stack information may be reported in real time, and a developer may discover an exception of an APP timely so as to carry out exception location and solve problem rapidly.

Achievement of purposes, functional characteristics and advantages of the present invention will be further described in combination with embodiments and with reference to the accompanying drawings.

DETAILED DESCRIPTION

It should be understood that specific embodiments described herein are only adopted to explain the present invention and not intended to limit the present invention.

Figure 1:
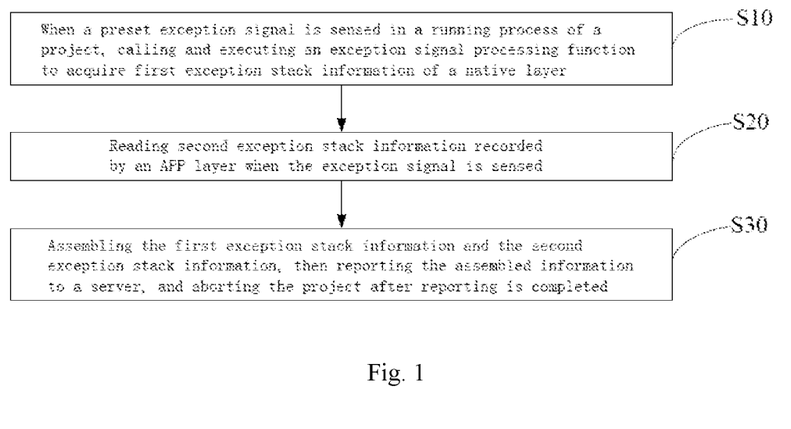
FIG. 1 is a flowchart of a first embodiment of an exception stack information acquisition method according to the present invention.

The present invention provides an exception stack information acquisition method. Referring to FIG. 1, a flowchart of a first embodiment of an exception stack information acquisition method according to the present invention is shown. The method may be executed by a device, and the device may be implemented by software and/or hardware.

In the embodiment, the exception stack information acquisition method includes the following steps.

In Step S10, when a preset exception signal is sensed in a running process of a project, an exception signal processing function is called and executed to acquire first exception stack information of a native layer.

In the embodiment of the present invention, the project is an APP program formed by codes. A terminal may download the project from a server and install and run it. In the running process of the project on the terminal, a running condition of the project is detected in real time. Various preset types of exception signals are preset, for example, </br>

_SIGABRT: generated by calling of an abort function and representing abort of a process </br>_.

_SIGILL: illegal instruction exception </br>_.

_SIGBUS: specific hardware exception usually caused by memory access </br>_.

_SIGFPE: math related exception, for example, division by 0 and floating point removal </br>_.

_SIGSEGV: illegal memory access </br>_.

In the running process of the project, when a related exception of the project occurs, a corresponding exception signal may be triggered to notify a process of the occurrence of an asynchronous event. When the exception signal sensed by the terminal is a preset exception signal, the preset exception signal processing function is called and executed to acquire the first exception stack information of the native layer. The exception signal processing function is required to be preconfigured for calling.

As an implementation mode, the exception signal processing function may be implemented through the following codes:

```
<pre><code>
/* Signals to be caught. */
#define SIG_CATCH_COUNT 5
static const int native_sig_catch[SIG_CATCH_COUNT]=
{SIGABRT, SIGILL, SIGBUS, SIGFPE, SIGSEGV};
/*
* registration exception signal processing function
*/
int sigaction_handler_init(void) {
struct sigaction sa_catch;
sa_catch.sa_sigaction = skn_signal_handler;
sa_catch.sa_flags = SA_SIGINFO;
size_t i = 0;
for (i = 0; native_sig_catch[i] != 0; i++) {
const int sig = native_sig_catch[i];
const struct sigaction *const action = &sa_catch;
if (sigaction(sig, action, NULL) != 0) {
return −1;
}
}
return 0;
}
</code></pre>,
``` wherein the function _skn\_signal\_handler_ is the function executed after the exception signal is detected, and acquisition of the exception stack information is implemented in this function.

Due to different versions of an operating system used by the terminal, different exception signal processing functions are configured. Therefore, Step S10 may include the following detailed steps:

when the preset exception signal is sensed in the running process of the project, version information of an operating system running the project is determined; and the exception signal processing function corresponding to the version information of the operating system is called and executed to acquire exception address information, and the first exception stack information is generated according to the address information.

Specifically, if the version of the operating system is lower than a preset version, a first preset function is called to acquire the exception address information, and a function name and so library information corresponding to the address information are acquired through a dladdr function; and if the version of the operating system is higher than or equal to the preset version, a second preset function is called from a preset path to acquire the exception address information through a dlopen function, and the function name and so library information corresponding to the address information are acquired through the dladdr function, wherein the first preset function is a preconfigured exception signal processing function, and the second preset function is a function defined by the operating system, is not required to be preconfigured by a user, and is only required to be called from a specific path when the exception signal is sensed. In the embodiment, the exception stack information mainly includes the exception function name and so library information.

An Android system is taken as an example below. The preset version is Android 5.0. Since Android RunTime (ART) virtual machines are adopted for Android from Android 5.0, two solutions are required by exception information acquisition of versions above Android 5.0 and below Android 5.0, an unwind method is used for versions above Android 5.0, and a libcorkscrew.so method is used for versions below Android 5.0. Specifically, about use of the unwind method, an unwind.h header file may be introduced into the codes, and after the exception address information is acquired through a \_Unwind\_Backtrace function, the function name and so library information corresponding to the address information are acquired through the dladdr function. About use of the libcorkscrew.so method, the preset path is a /system/lib/ path of an Android 4.x version, a corresponding library is opened through the dlopen function, thereby calling the libcorkscrew.so method, the exception address information exception is queried on the basis of the method, and then the corresponding function name and so library information are searched on the basis of the address information.

Preferably, as an implementation mode, for allowing a developer to know about specific information of the exception signal, the first exception stack information further includes a signal type of the sensed exception signal.

The step of calling and executing the exception signal processing function corresponding to the version information of the operating system to acquire the exception address information and generating the first exception stack information according to the address information includes that: the exception signal processing function corresponding to the version information of the operating system is called and executed to acquire the exception address information; exception stack data is acquired according to the address information, and a signal type of the sensed exception signal is acquired; and the signal type and the exception stack data are assembled to generate the first exception stack information.

After the corresponding exception stack data is acquired according to the exception address information, the signal type of the exception signal recorded when the exception signal is sensed is acquired, the signal type and the exception stack data are assembled to generate the first exception stack information, and the exception stack data includes the found exception function name and so library information, wherein, after the first exception stack information is acquired and locally stored in the native layer, the native layer may send notification information to an APP layer to notify the APP layer of reading, and for an Android system, the APP layer is a Java layer. When the signal type and the exception stack data are assembled in the native layer, a preset separator is used for separation, so as to facilitate distinction in the APP layer.

In Step S20, second exception stack information recorded by an APP layer when the exception signal is sensed is read.

In Step S30, the first exception stack information and the second exception stack information are assembled, then the assembled information is reported to a server, and the project is aborted after reporting is completed.

Under a normal condition, when the exception signal is sensed, the APP layer of the terminal may record its exception stack information and store it usually in a fixed path according to a system setting. Therefore, when the exception signal is detected, the stored exception information may be directly read from the set path as the second exception stack information.

The acquired first exception stack information of the native layer and the read second exception stack information recorded by the APP layer are encapsulated, and then reported to the server to enable the developer to timely rather locate than analyze the exception code in the APP program and further timely maintain and update the APP program. After reporting is completed, the present project is aborted.

In the prior art, a manner of acquiring an exception stack of the native layer usually brings about large code quantity, for example, Google BreakPad, or a system root right, for example, tombstone, is required to read the related stack information, and a process is excessively tedious.

According to the exception stack information acquisition method disclosed by the embodiment, when the preset exception signal is sensed in the running process of the project, the exception stack information of the native layer is acquired through the predefined function, so that the code quantity is small, and no root right is required. Moreover, the second exception stack information recorded by the APP layer when the exception signal is sensed is read, the two pieces of exception stack information are encapsulated and uploaded to the server, and then the APP is aborted, so that the APP is prevented from being directly forcibly terminated after the exception is detected. Therefore, complete exception stack information including that of the native layer may be timely acquired and uploaded to the server, occurrence of the exception may be comprehensively monitored, the exception stack information may be reported in real time, and the developer may timely discover the exception of the APP, so as to carry out location and solve problem rapidly.

Figure 2:
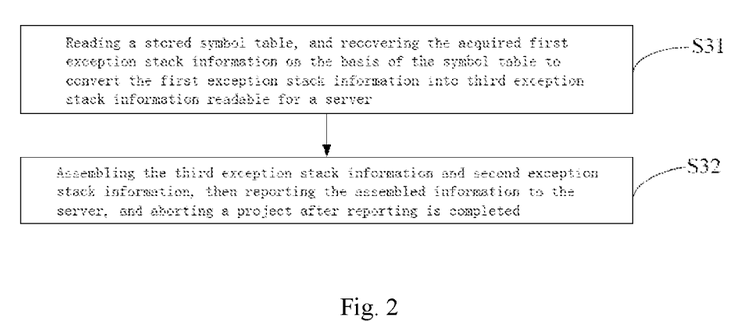
FIG. 2 is a detailed flowchart of Step S30 in a second embodiment of an exception stack information acquisition method according to the present invention.

A second embodiment of the exception stack information acquisition method of the present invention is disclosed on the basis of the first embodiment. Referring to FIG. 2, in the embodiment, Step S30 includes the following detailed steps.

In Step S31, a stored symbol table is read, and the acquired first exception stack information is recovered on the basis of the symbol table to convert the first exception stack information into third exception stack information readable for the server.

In Step S32, the third exception stack information and the second exception stack information are assembled and then reported to the server, and the project is aborted after reporting is completed.

Under a normal condition, the first exception stack information acquired in the foregoing manner is relatively low in readability for the developer, the corresponding function name may be simply obtained from the first exception information only, and a filename and row number with the exception may not be directly learned about. For improving the readability, after the first exception stack information is acquired, the first exception stack information is recovered through the symbol table matched with the APP to obtain the third exception stack information including the function name and the filename and row number corresponding to the function name, wherein the symbol table is a data structure configured for a language translator, and in the symbol table, each identifier in program source codes is bound with its declaration or usage information. In the embodiment, each function name in the symbol table of the project has its corresponding filename and row number. Each version of the project corresponds to a symbol table, and if the project is upgraded, its symbol table is required to be updated.

Preferably, in another embodiment, for improving security of project information, the symbol table may be stored in the server, and the server performs recovery processing on the first exception stack information according to the stored symbol table after receiving the exception stack information reported by the terminal.

In the embodiment, an information recovery script is preconfigured. After the first exception stack information is acquired, the information recovery script is started, the function name in the first exception stack information is sequentially matched with function names in the symbol table one by one on the basis of the information recovery script to acquire the filename and row number corresponding to the function name in the first exception stack information, and the acquired filename and row number are added to the original first exception stack information to generate the third exception stack information readable for the server.

The information recovery script may be

```
<code><pre>
./SknSymbol.sh crash.txt symbol.txt >result.txt
</code></pre>,
``` wherein crash.txt is unrecovered exception information, i.e., the first exception stack information; symbol.txt is the symbol table; and result.txt is recovered exception information, i.e., the third exception stack information.

For example, if the acquired exception information is

```
<code><pre>
\_Z2aav /data/app/com.pingan.pad_demo-2/lib/arm/libcrash.so
</code></pre>,
exception information recovered by using the information recovery script is
<code><pre>
Z2aav
 /Users/duyuan797/Workspace/sky-eye/sky-eye/src/main/cpp/./src/skncrash.cpp:72
/data/app/com.pingan.pad_demo-2/lib/arm/libcrash.so
</code></pre>
```

According to the method disclosed by the embodiment, the acquired first exception stack information of the native layer is recovered to improve its readability for the server to enable the developer to acquire more complete exception information.

Figure 3:
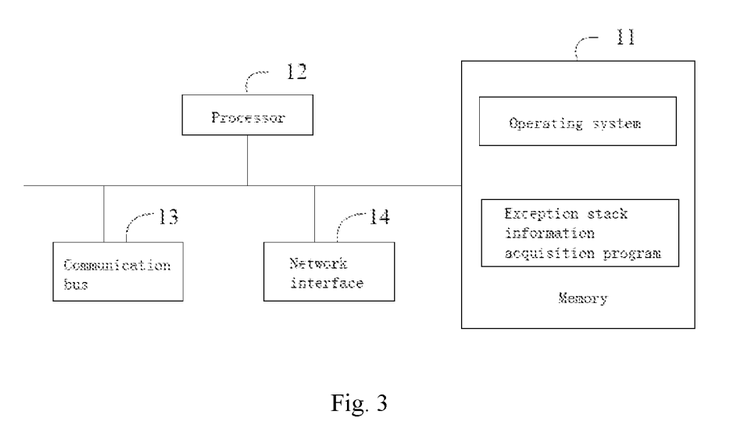
FIG. 3 is a schematic diagram of a preferred embodiment of an exception stack information acquisition device according to the present invention.

Referring to FIG. 3, a schematic diagram of a preferred embodiment of an exception stack information acquisition device according to the present invention is shown.

In the embodiment, the exception stack information acquisition device may be mobile terminal equipment with a display function, for example, a smart phone, a tablet computer, an electronic book reader, a Moving Picture Experts Group Audio Layer III (MP3) player, a Moving Picture Experts Group Audio Layer IV (MP4) player and a portable computer.

The exception stack information includes a memory 11, a processor 12, a communication bus 13 and a network interface 14, wherein the communication bus 13 is configured to implement connection communication between these components. The network interface 14 may optionally include a standard wired interface and wireless interface (for example, a Wireless Fidelity (WI-FI interface). The memory 11 may be a high-speed Random Access Memory (RAM) and may also be a non-volatile memory such as a disk memory.

In some embodiments, the memory 11 may be an internal storage unit of the exception stack information acquisition device, for example, a hard disk of the exception stack information acquisition device; and in some other embodiments, the memory 11 may also be external storage equipment of the exception stack information acquisition device, for example, a plug-in type hard disk, Smart Media Card (SMC), Secure Digital (SD) card and flash card configured on the exception stack information acquisition device. Furthermore, the memory 11 may also not only include the internal storage unit of the exception stack information acquisition device but also include the external storage equipment. The memory 11 may not only be configured to store APP software and various types of data of the exception stack information acquisition device, for example, a code of an exception stack information acquisition program, but also be configured to temporally store data which has been output or will be output.

The processor 12, in some embodiments, may be a Central Processing Unit (CPU), a microprocessor or another data processing chip, and is configured to run the program code or process data stored in the memory 11, for example, executing the exception stack information acquisition program.

The exception stack information acquisition device with the components 11-14 and the exception stack information acquisition program is shown in FIG. 3 only. However, it should be understood that not all of the shown components are required to be implemented and more or fewer components may be implemented instead.

Optionally, the device may further include a user interface, the user interface may include a display and an input unit such as a keyboard, and the user interface may also optionally include a standard wired interface and wireless interface. In some embodiments, the display may be a Light-Emitting Diode (LED) display, a liquid crystal display, a touch liquid crystal display, an Organic LED (OLED) touch display and the like. The display is configured to display information processed in the exception stack information acquisition device and configured to display a visual user interface.

Optionally, the device may further include a camera, a Radio Frequency (RF) circuit, a sensor, an audio circuit, a WI-FI module and the like, wherein the sensor is, for example, a light sensor, a motion sensor and another sensor. Specifically, the light sensor may include an ambient light sensor and a proximity sensor, wherein, if the device is a mobile terminal, the ambient light sensor may regulate brightness of a display screen according to brightness of ambient light, and the proximity sensor may turn off the display screen and/or backlight when the mobile terminal is moved to the ear. As a motion sensor, a gravity acceleration sensor may detect a magnitude of an acceleration in each direction (usually three axes), may detect a magnitude and direction of the gravity in a stationary state, and may be configured for an APP recognizing a posture of the mobile terminal (for example, landscape and portrait switching, a related game and magnetometer posture calibration), a vibration recognition related function and the like (for example, a pedometer and knocking). Of course, the mobile terminal may further be configured with other sensors, for example, a gyroscope, a barometer, a hygrometer, a thermometer and an infrared sensor, which will not be elaborated herein.

In the device embodiment shown in FIG. 3, the memory 11 used as a computer storage medium may include an operating system and the exception stack information acquisition process; the network interface 14 is mainly configured to connect a server and perform data communication with the server; and the processor 12 executes the exception stack information acquisition program stored in the memory 11 to implement the steps of:

when a preset exception signal is sensed in a running process of a project, calling and executing an exception signal processing function to acquire first exception stack information of a native layer;

reading second exception stack information recorded by an APP layer when the exception signal is sensed; and assembling the first exception stack information and the second exception stack information, then reporting the assembled information to a server, and aborting the project after reporting is completed.

In the embodiment of the present invention, the project is an APP program formed by codes. A terminal may download the project from the server and install and run it. In the running process of the project on the terminal, a running condition of the project is detected in real time. Various preset types of exception signals are preset, for example, </br>

_SIGABRT: generated by calling of an abort function and representing abort of a process </br>_.

_SIGILL: illegal instruction exception </br>_.

_SIGBUS: specific hardware exception usually caused by memory access </br>_.

_SIGFPE: math related exception, for example, division by 0 and floating point removal </br>_.

_SIGSEGV: illegal memory access </br>_.

In the running process of the project, when a related exception of the project occurs, a corresponding exception signal may be triggered to notify a process of the occurrence of an asynchronous event. When the exception signal sensed by the terminal is a preset exception signal, the preset exception signal processing function is called and executed to acquire the first exception stack information of the native layer. The exception signal processing function is required to be preconfigured for calling.

As an implementation mode, the exception signal processing function may be implemented through the following codes:

```
<pre><code>
/* Signals to be caught. */
#define SIG_CATCH_COUNT 5
    static const int native_sig_catch[SIG_CATCH_COUNT]=
{SIGABRT, SIGILL, SIGBUS, SIGFPE, SIGSEGV};
    /*
    * registration exception signal processing function
    */
    int sigaction_handler_init(void) {
    struct sigaction sa_catch;
    sa_catch.sa_sigaction = skn_signal_handler;
    sa_catch.sa_flags = SA_SIGINFO;
    size_t i = 0;
    for (i = 0; native_sig_catch[i] != 0; i++) {
    const int sig = native_sig_catch[i];
    const struct sigaction *const action = &sa_catch;
    if (sigaction(sig, action, NULL) != 0) {
    return -1;
    }
    }
    return 0;
    }
</code></pre>,
``` wherein the function _skn\_signal\_handler_ is the function executed after the exception signal is detected, and acquisition of the exception stack information is implemented in this function.

Due to different versions of an operating system used by the terminal, different exception signal processing functions are configured. Therefore, the exception stack information acquisition program is executed by the processor 12 to further implement the steps of:

when the preset exception signal is sensed in the running process of the project, determining version information of an operating system running the project; and calling and executing the exception signal processing function corresponding to the version information of the operating system to acquire exception address information, and generating the first exception stack information according to the address information.

Specifically, the exception stack information acquisition program is executed by the processor 12 to further implement the steps of:

if the version of the operating system is lower than a preset version, calling a first preset function to acquire the exception address information, and acquiring a function name and so library information corresponding to the address information through a dladdr function; and if the version of the operating system is higher than or equal to the preset version, calling a second preset function from a preset path to acquire the exception address information through a dlopen function, and acquiring the function name and so library information corresponding to the address information through the dladdr function, wherein the first preset function is a preconfigured exception signal processing function, and the second preset function is a function defined by the operating system, is not required to be preconfigured by a user, and is only required to be called from a specific path when the exception signal is sensed. In the embodiment, the exception stack information mainly includes the exception function name and so library information.

An Android system is taken as an example below. The preset version is Android 5.0. Since ART virtual machines are adopted for Android from Android 5.0, two solutions are required by exception information acquisition of versions above Android 5.0 and below Android 5.0, an unwind method is used for versions above Android 5.0, and a libcorkscrew.so method is used for versions below Android 5.0. Specifically, about use of the unwind method, an unwind.h header file may be introduced into the codes, and after the exception address information is acquired through a \_Unwind\_Backtrace function, the function name and so library information corresponding to the address information are acquired through the dladdr function. About use of the libcorkscrew.so method, the preset path is a /system/lib/ path of an Android 4.x version, a corresponding library is opened through the dlopen function, thereby calling the libcorkscrew.so method, the exception address information is queried on the basis of the method, and then the corresponding function name and so library information are searched on the basis of the address information.

Preferably, as an implementation mode, for allowing a developer to know about specific information of the exception signal, the first exception stack information further includes a signal type of the sensed exception signal.

The exception stack information acquisition program is executed by the processor 12 to further implement the following steps:

the step of calling and executing the exception signal processing function corresponding to the version information of the operating system to acquire the exception address information and generating the first exception stack information according to the address information includes: calling and executing the exception signal processing function corresponding to the version information of the operating system to acquire the exception address information; acquiring exception stack data according to the address information, and acquiring a signal type of the sensed exception signal; and assembling the signal type and the exception stack data to generate the first exception stack information.

After the corresponding exception stack data is acquired according to the exception address information, the signal type of the exception signal recorded when the exception signal is sensed is acquired, the signal type and the exception stack data are assembled to generate the first exception stack information, and the exception stack data includes the found exception function name and so library information, wherein, after the first exception stack information is acquired and locally stored in the native layer, the native layer may send notification information to an APP layer to notify the APP layer of reading, and for an Android system, the APP layer is a Java layer. When the signal type and the exception stack data are assembled in the native layer, a preset separator is used for separation, so as to facilitate distinction in the APP layer.

Under a normal condition, when the exception signal is sensed, the APP layer of the terminal may record its exception stack information and store it usually in a fixed path according to a system setting. Therefore, when the exception signal is detected, the stored exception information may be directly read from the set path as the second exception stack information.

The acquired first exception stack information of the native layer and the read second exception stack information recorded by the APP layer are encapsulated, and then are reported to the server to enable the developer to timely rather locate than analyze the exception code in the APP program and further timely maintain and update the APP program. After reporting is completed, the present project is aborted.

In the prior art, a manner of acquiring an exception stack of the native layer usually results in large code quantity, for example, Google BreakPad, or a system root right, for example, tombstone, is required to read the related stack information, and a process is excessively tedious.

According to the exception stack information acquisition device disclosed by the embodiment, when the preset exception signal is sensed in the running process of the project, the exception stack information of the native layer is acquired through the predefined function, so that the code quantity is small, and no root right is required. Moreover, the second exception stack information recorded by the APP layer when the exception signal is sensed is read, the two pieces of exception stack information are encapsulated and uploaded to the server, and then the APP is aborted, so that the APP is prevented from being directly forcibly terminated after exception is detected. Therefore, complete exception stack information including that of the native layer may be timely acquired and uploaded to the server, occurrence of the exception may be comprehensively monitored, the exception stack information may be reported in real time, and the developer may discover the exception of the APP timely, and carry out exception location and solve problem rapidly.

A second embodiment of the exception stack information acquisition device of the present invention is disclosed on the basis of the first embodiment. In the embodiment, the exception stack information acquisition program is executed by the processor 12 to further implement the steps of:

reading a stored symbol table, and recovering the acquired first exception stack information on the basis of the symbol table to convert the first exception stack information into third exception stack information readable for the server; and assembling the third exception stack information and the second exception stack information, then reporting the assembled information to the server, and aborting the project after reporting is completed.

Under a normal condition, the first exception stack information acquired in the foregoing manner is relatively low in readability for the developer, the corresponding function name may be simply obtained from the first exception information only, and a filename and row number with the exception may not be directly learned about. For improving the readability, after the first exception stack information is acquired, the first exception stack information is recovered by using the symbol table matched with the APP to obtain the third exception stack information including the function name and the filename and row number corresponding to the function name, wherein the symbol table is a data structure configured for a language translator, and in the symbol table, each identifier in program source codes is bound with its declaration or usage information. In the embodiment, each function name in the symbol table of the project has its corresponding filename and row number. Each version of the project corresponds to a symbol table, and if the project is upgraded, its symbol table is required to be updated.

Preferably, in another embodiment, for improving security of project information, the symbol table may be stored in the server, and the server performs recovery processing on the first exception stack information according to the stored symbol table after receiving the exception stack information reported by the terminal.

In the embodiment, an information recovery script is preconfigured, and after the first exception stack information is acquired, the processor 12 executes the exception stack information acquisition program to implement the steps of:

starting the information recovery script, sequentially matching the function name in the first exception stack information with function names in the symbol table one by one the basis of the information recovery script to acquire the filename and row number corresponding to the function name in the first exception stack information, and adding the acquired filename and row number to the original first exception stack information to generate the third exception stack information readable for the server.

The information recovery script may be

```
<code><pre>
./SknSymbol.sh crash.txt symbol.txt >result.txt
</code></pre>
```
, wherein crash.txt is unrecovered exception information, i.e., the first exception stack information; symbol.txt is the symbol table; and result.txt is recovered exception information, i.e., the third exception stack information.

For example, if the acquired exception information is

```
<code><pre>
\_Z2aav /data/app/com.pingan.pad_demo-2/lib/arm/libcrash.so
</code></pre>
```
, exception information recovered by using the information recovery script is According to the device disclosed by the embodiment, the first exception stack information, which is acquired by the exception stack information acquisition program, of the native layer is recovered to improve its readability for the server to enable the developer to acquire more complete exception information.

Optionally, in another embodiment, the exception stack information acquisition program may further be divided into one or more modules, and the one or more modules are stored in the memory 11 and executed by one or more processors (the processor 12 in the embodiment) to implement the present invention. The modules mentioned in the present invention refer to a series of computer program instruction segments capable of realizing specific functions and are configured to describe an execution process of the exception stack information acquisition program in the exception stack information acquisition device.

Figure 4:
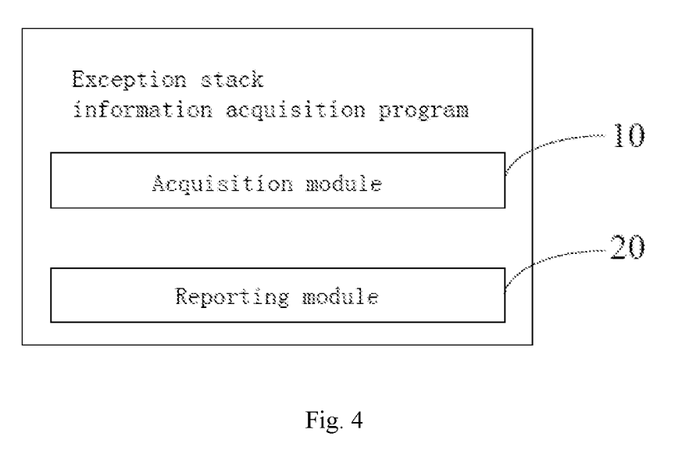
FIG. 4 is a schematic diagram of functional modules of an exception stack information acquisition program in an exception stack information acquisition device according to the present invention.

For example, in an embodiment, the exception stack information acquisition program may be divided into an acquisition module 10 and a reporting module 20. Referring to FIG. 4, a schematic diagram of functional modules of an exception stack information acquisition program in an exception stack information acquisition device according to the present invention is shown, wherein the acquisition module 10 is configured to, when the preset exception signal is sensed in the running process of the project, call and execute the exception signal processing function to acquire the first exception stack information of the native layer and read the second exception stack information recorded by the APP layer when the exception signal is sensed; and the reporting module 20 is configured to assemble the first exception stack information and the second exception stack information and report the assembled information to the server and abort the project after reporting is completed.

In addition, an embodiment of the present invention further discloses a computer-readable storage medium storing therein an exception stack information acquisition program, wherein the exception stack information acquisition program is executed by a processor to implement the following operation:

when a preset exception signal is sensed in a running process of a project, calling and executing an exception signal processing function to acquire first exception stack information of a native layer;

reading second exception stack information recorded by an APP layer when the exception signal is sensed; and assembling the first exception stack information and the second exception stack information, then reporting the assembled information to a server, and aborting the project after reporting is completed.

Furthermore, the exception stack information acquisition program is executed by the processor to further implement the following operation:

when the preset exception signal is sensed in the running process of the project, determining version information of an operating system running the project; and calling and executing the exception signal processing function corresponding to the version information of the

```
<code><pre>
Z2aav
   /Users/duyuan797/Workspace/sky-eye/sky-eye/src/main/cpp/./src/skncrash.cpp:72
/data/app/com.pingan.pad_demo-2/lib/arm/libcrash.so
</code></pre>
``` operating system to acquire exception address information, and generating the first exception stack information according to the address information.

Furthermore, the exception stack information acquisition program is executed by the processor to further implement the following operation:

calling and executing the exception signal processing function corresponding to the version information of the operating system to acquire the exception address information;

acquiring exception stack data according to the address information, and acquiring a signal type of the sensed exception signal; and assembling the signal type and the exception stack data to generate the first exception stack information.

Furthermore, the exception stack information acquisition program is executed by the processor to further implement the following operation:

reading a stored symbol table, and recovering the acquired first exception stack information on the basis of the symbol table to convert the first exception stack information into third exception stack information readable for the server; and assembling the third exception stack information and the second exception stack information, then reporting the assembled information to the server, and aborting the project after reporting is completed.

It is necessary to note that terms "include", "contain" or any other variation thereof in the present invention is intended to include other nonexclusive inclusions, so that a process, method, article or device including a series of elements not only includes those elements but also includes other elements which are not clearly listed or also includes elements intrinsic to the process, the method, the article or the device. Under the condition of no more restrictions, an element defined by a statement "including a/an . . . " does not exclude existence of the same other element in a process, method, article or device including the element.

Sequence numbers of the embodiments of the present invention are only for description and do not represent quality of the embodiments.

From the foregoing descriptions about the implementation modes, those skilled in the art may clearly know that the method of the embodiment may be implemented in a manner of combining software and a necessary universal hardware platform, and of course, may also be implemented by hardware, and the former is a preferred implementation mode in many cases. Based on such an understanding, the technical solutions of the present invention substantially or parts making contributions to the prior art may be embodied in form of software product, and the computer software product is stored in the abovementioned storage medium (for example, a Read-Only Memory (ROM)/RAM, a magnetic disk and an optical disk), including a plurality of instructions configured to enable a piece of computer equipment (which may be a mobile phone, a computer, a server, network equipment or the like) to execute the method in each embodiment of the present invention.

The above is only the preferred embodiment of the present invention and not thus intended to limit the patent scope of the present invention. Any equivalent structural or equivalent flow transformations made by virtue of the contents of the specification and accompanying drawings of the present invention or their direct or indirect application to other related technical fields shall also fall within the scope of patent protection of the present invention.

The invention claimed is:

1. An exception stack information acquisition method, comprising steps of:

when a preset exception signal is sensed in a running process of a project, calling and executing an exception signal processing function to acquire first exception stack information of a native layer, wherein the calling and executing step comprises: when the preset exception signal is sensed in the running process of the project, determining version information of an operating system for running the project; and calling and executing the exception signal processing function corresponding to the version information of the operating system to acquire exception address information, and generating the first exception stack information according to the exception address information;

reading second exception stack information recorded by an Application (APP) layer when the exception signal is sensed; and assembling the first exception stack information and the second exception stack information to obtain a first assembled information, then reporting the first assembled information to a server, and aborting the project after reporting is completed, wherein the assembling step comprises: reading a stored symbol table, and recovering the acquired first exception stack information on the basis of the stored symbol table to convert the first exception stack information into third exception stack information readable for the server; and assembling the third exception stack information and the second exception stack information to obtain a second assembled information, then reporting the second assembled information to the server, and aborting the project after reporting is completed.

2. The exception stack information acquisition method of claim 1, wherein the step of calling and executing the exception signal processing function corresponding to the version information of the operating system to acquire the exception address information and generating the first exception stack information according to the exception address information comprises:

calling and executing the exception signal processing function corresponding to the version information of the operating system to acquire the exception address information;

acquiring exception stack data according to the exception address information, and acquiring a signal type of the sensed exception signal; and assembling the signal type and the exception stack data to generate the first exception stack information.

3. The exception stack information acquisition method of claim 2, wherein the step of assembling the first exception stack information and the second exception stack information to obtain the first assembled information, then reporting the first assembled information to the server, and aborting the project after reporting is completed comprises:

reading the stored symbol table, and recovering the acquired first exception stack information on the basis of the stored symbol table to convert the first exception stack information into the third exception stack information readable for the server; and assembling the third exception stack information and the second exception stack information to obtain a second assembled information, then reporting the second assembled information to the server, and aborting the project after reporting is completed.

4. The exception stack information acquisition method of claim 3, wherein the step of reading the stored symbol table and recovering the acquired first exception stack information on the basis of the stored symbol table to convert the first exception stack information into the third exception stack information readable for the server comprises:

starting an information recovery script, and sequentially matching a function name in the first exception stack information with function names in the symbol table one by one on the basis of the information recovery script to acquire a filename and a row number corresponding to the function name in the first exception stack information; and adding the filename and the row number to an original first exception stack information to generate the third exception stack information readable for the server.

5. The exception stack information acquisition method of claim 1, wherein the step of reading the stored symbol table and recovering the acquired first exception stack information on the basis of the stored symbol table to convert the first exception stack information into the third exception stack information readable for the server comprises:

starting an information recovery script, and sequentially matching a function name in the first exception stack information with the function names in the stored symbol table one by one on the basis of the information recovery script to acquire a filename and a row number corresponding to the function name in the first exception stack information; and adding the file name and the row number to an original first exception stack information to generate the third exception stack information readable for the server.

6. An exception stack information acquisition device, comprising: a memory, a processor, and an exception stack information acquisition program stored on the memory and capable of running on the processor; wherein the exception stack information acquisition program is executed by the processor to implement steps of:

when a preset exception signal is sensed in a running process of a project, calling and executing an exception signal processing function to acquire first exception stack information of a native layer, wherein the calling and executing step comprises: when the preset exception signal is sensed in the running process of the project, determining version information of an operating system for running the project; and calling and executing the exception signal processing function corresponding to the version information of the operating system to acquire exception address information, and generating the first exception stack information according to the exception address information;

reading second exception stack information recorded by an Application (APP) layer when the exception signal is sensed; and assembling the first exception stack information and the second exception stack information to obtained a first assembled information, then reporting the first assembled information to a server, and aborting the project after reporting is completed, wherein the assembling step comprises: reading a stored symbol table, and recovering the acquired first exception stack information on the basis of the stored symbol table to convert the first exception stack information into third exception stack information readable for the server; and assembling the third exception stack information and the second exception stack information to obtain a second assembled information, then reporting the second assembled information to the server, and aborting the project after reporting is completed.

7. The exception stack information acquisition device of claim 6, wherein the step of calling and executing the exception signal processing function corresponding to the version information of the operating system to acquire the exception address information and generating the first exception stack information according to the exception address information comprises:

calling and executing the exception signal processing function corresponding to the version information of the operating system to acquire the exception address information;

acquiring exception stack data according to the exception address information, and acquiring a signal type of the sensed exception signal; and assembling the signal type and the exception stack data to generate the first exception stack information.

8. The exception stack information acquisition device of claim 7, wherein the step of assembling the first exception stack information and the second exception stack information to obtain the first assembled information, then reporting the first assembled information to the server, and aborting the project after reporting is completed comprises:

reading the stored symbol table, and recovering the acquired first exception stack information on the basis of the stored symbol table to convert the first exception stack information into the third exception stack information readable for the server; and assembling the third exception stack information and the second exception stack information to obtain a second assembled information, then reporting the second assembled information to the server, and aborting the project after reporting is completed.

9. The exception stack information acquisition device of claim 8, wherein the step of reading the stored symbol table and recovering the acquired first exception stack information on the basis of the stored symbol table to convert the first exception stack information into the third exception stack information readable for the server comprises:

starting an information recovery script, and sequentially matching a function name in the first exception stack information with function names in the symbol table one by one on the basis of the information recovery script to acquire a filename and a row number corresponding to the function name in the first exception stack information; and adding the file name and the row number to the original first exception stack information to generate the third exception stack information readable for the server.

10. The exception stack information acquisition device of claim 6, wherein the step of reading the stored symbol table and recovering the acquired first exception stack information on the basis of the stored symbol table to convert the first exception stack information into the third exception stack information readable for the server comprises:

starting an information recovery script, and sequentially matching a function name in the first exception stack information with the function names in the stored symbol table one by one on the basis of the information recovery script to acquire a filename and a row number corresponding to the function name in the first exception stack information; and adding the filename and the row number to an original first exception stack information to generate the third exception stack information readable for the server.

11. A non-transitory computer-readable storage medium, wherein the computer-readable storage medium stores an exception stack information acquisition program; and wherein the exception stack information acquisition program is executed by a processor to implement the steps of:
when a preset exception signal is sensed in a running process of a project, calling and executing an exception signal processing function to acquire first exception stack information of a native layer, wherein the calling and executing step comprises: when the preset exception signal is sensed in the running process of the project, determining version information of an operating system for running the project; and calling and executing the exception signal processing function corresponding to the version information of the operating system to acquire exception address information, and generating the first exception stack information according to the exception address information;
reading second exception stack information recorded by an Application (APP) layer when the exception signal is sensed; and
assembling the first exception stack information and the second exception stack information to obtained a first assembled information, then reporting the first assembled information to a server, and aborting the project after reporting is completed, wherein the assembling step comprises: reading a stored symbol table, and recovering the acquired first exception stack information on the basis of the stored symbol table to convert the first exception stack information into third exception stack information readable for the server; and assembling the third exception stack information and the second exception stack information to obtain a second assembled information, then reporting the second assembled information to the server, and aborting the project after reporting is completed.

12. The non-transitory computer-readable storage medium of claim 11, wherein the step of calling and executing the exception signal processing function corresponding to the version information of the operating system to acquire the exception address information and generating the first exception stack information according to the exception address information comprises:
calling and executing the exception signal processing function corresponding to the version information of the operating system to acquire the exception address information;
acquiring exception stack data according to the exception address information, and acquiring a signal type of the sensed exception signal; and
assembling the signal type and the exception stack data to generate the first exception stack information.

13. The non-transitory computer-readable storage medium of claim 12, wherein the step of assembling the first exception stack information and the second exception stack information to obtain the first assembled information, then reporting the first assembled information to the server, and aborting the project after reporting is completed comprises:
reading the stored symbol table, and recovering the acquired first exception stack information on the basis of the stored symbol table to convert the first exception stack information into the third exception stack information readable for the server; and
assembling the third exception stack information and the second exception stack information to obtain the second assembled information, then reporting the second assembled information to the server, and aborting the project after reporting is completed.

14. The non-transitory computer-readable storage medium of claim 11, wherein the step of reading the stored symbol table and recovering the acquired first exception stack information on the basis of the stored symbol table to convert the first exception stack information into the third exception stack information readable for the server comprises:
starting an information recovery script, and sequentially matching a function name in the first exception stack information with function names in the symbol table one by one on the basis of the information recovery script to acquire a filename and a row number corresponding to the function name in the first exception stack information; and
adding the file name and the row number to the original first exception stack information to generate the third exception stack information readable for the server.

* * * * *